Patented Aug. 23, 1927.

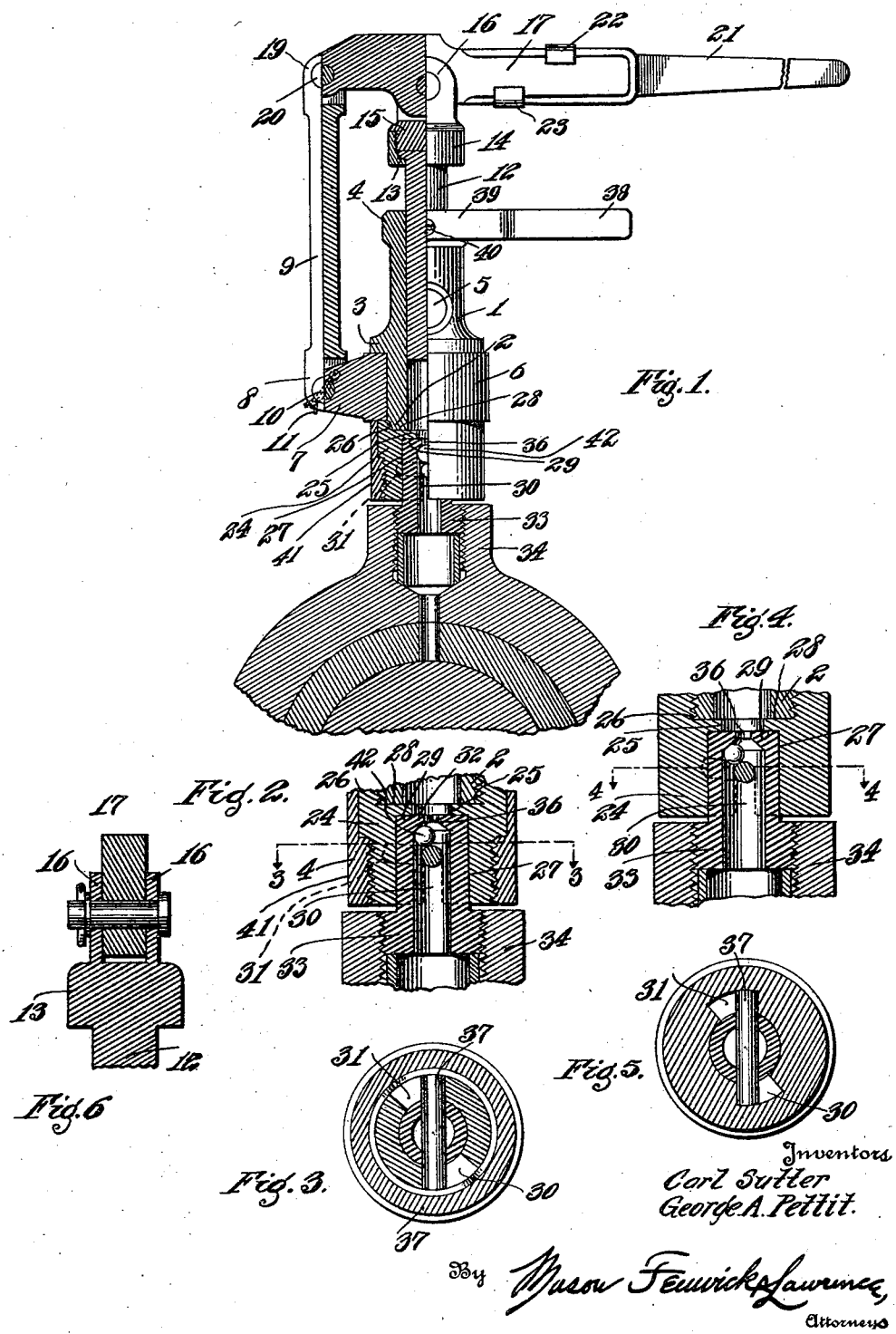

1,640,012

UNITED STATES PATENT OFFICE.

CARL SUTTER AND GEORGE A. PETTIT, OF NEW ORLEANS, LOUISIANA.

LUBRICATING DEVICE.

Application filed June 26, 1926. Serial No. 118,719.

This invention relates to improvements in a lubricating device, particularly adapted for use on locomotive connecting rod cups or any other equipment where the device could be used to advantage.

An object of this invention is to provide a rod cup lubricating device which specifically is intended to force a comparatively hard lubricant into the rod cups, which heretofore has not been successfully accomplished.

Another object of this invention is to provide a lubricating device which will operate to eliminate train delays due to heated pins caused from improper or lack of lubrication and may be easily applied to any locomotive at desired points, thereby also prolonging the life of the bearings and crank pins materially.

Another object of this invention is to provide a lubricating device which will eliminate, to a very large extent, the loss of grease cup plugs commonly in use and will accomplish a perfect application of the rod cup grease, hitherto not accomplished through any of the numerous types of grease cup plugs, or devices commonly used on locomotives.

A further object of this invention is to provide a rod cup lubricating device which will eliminate the expense of shopping engines, removing rods and applying expensive bushings to rods on account of original threads being stripped due to continuous removing of the plugs and compressing the hard grease which has a tendency to strip threads of the cups.

Another object of this invention is to provide a lubricating device which permits of the use of comparatively hard lubricant having the consistency approximately of yellow laundry soap, making it practical therefore, to use the driving journal compound in rod cups, thus eliminating the need for carrying different kinds of grease in stock.

Another object of this invention is to provide a device of the character described, which is adapted to engage with a suitable inlet opening on a locomotive rod cup or otherwise, and to permit of a relatively stiff lubricant for forcing therethrough into the rod cup or like receptacle, and preventing the return of the lubricant from the rod cup or receptacle therethrough.

An object is to provide in this invention an attachment which is to connect the discharge nozzle and lubricating device to the locomotive rod cup or other lubricant receptacles without changes being required in the ordinary construction of the locomotive rod cups.

Another object is also to provide a lubricant device which would effect great time and labor saving, thereby accomplishing economy through reduction of engine house delays and the like, and allowing the motive power to be used to the maximun service. The use of this invention furthermore, would make it possible to throughly fill rod cups while making station stops, particularly with long run engines.

A further object of this invention is to provide means in a lubricating device for forcing the stiff lubricant past a receiving opening in the wall of the tubular body portion of the device thereby providing an efficient means for loading the lubricating receptacle.

Further objects of this invention will appear from the following detailed description of the device and from the single sheet of drawings which is herewith made a part of this application:

In the drawings,

Fig. 1 illustrates an elevational sectional view of the lubricating device.

Fig. 2 represents a sectional view of a portion of the lubricating device showing the nozzle, nipple, pin and valve elements in operable relationship.

Fig. 3 is a section view of Fig. 2 at 3—3.

Fig. 4 is a modified form of Fig. 2.

Fig. 5 is a section view of Fig. 4 at 5—5.

Fig. 6 illustrates a modified form of upper plunger end as disclosed in Fig. 1.

The rod cup lubricating device comprises a tubular body or barrel 1 which is adapted to be open at its opposite ends and provided with a relatively short externally threaded and reduced lower screw end portion. the body or barrel 1 normally being vertically disposed, the body 1 being formed at a level somewhat nearer its lower end than its upper end with an external flange 3 and the upper end portion of the tubular body or barrel 1 may be enlarged externally as at 4. The bore of the body 1 may be uniform in diameter throughout its entire length and the body 1 is preferably provided with a lateral inlet opening 5 which is located above the level of the flange 3. A collar 6 is rotatably disposed on the barrel or body portion 1 with the upper edge of the collar in contact with the flange 3. An integral lug 7 extends radially outwardly from the collar 6 and is straddled by forks 8 at the lower end of a link 9; the forks 8 are connected with the lugs 7 by a headed transverse pivoted element 10 which extends through aligned openings in the forks 8 and the lug 7 and is retained against displacement in any suitable known manner as by means of a cotter pin 11 and the head of the pivot element 10. A vertical reciprocal plunger 12 fits slidably in the bore of the tubular body or barrel 1, and protrudes from the upper end of the tubular body or barrel 1, the upper end portion of the plunger 12 being enlarged at 13 and provided with an internally threaded collar 14. An external screw threaded plug 15 is screwed into the collar 14 and is formed with a pair of upstanding spaced integral ears 16, which operate with the lever to form a fulcrum; one end portion of the handle lever is straddled by a pair of integral forks 19 at the upper end of the link 9 and is connected with the forks 19 by means of a transverse pivot element 20. The parts 16, 15 and 13 may be adapted to comprise a head for the plunger 12 and obviously these parts may be formed integrally with one another and with the body of the plunger portion as in Fig. 6. In order to obtain relatively great leverage when the longer end of the operating lever 17 is actuated, use may be made of an auxiliary handle 21 having longitudinally spaced arcuately curved attaching lugs 22 and 23 respectively at the upper and lower edges of the end portion of the auxiliary handle 21 and adapted to embrace the upper and lower edge portion of the longer end of the lever 17 when an end portion of the auxiliary handle 21 is disposed flatwise against a side face of the longer end portion of the lever 17, the handle 21 being capable of longitudinal movement in the general direction of the extremity of the longer end portion of the lever 17 when it is desired to detach the auxiliary handle 21 from the operating lever 17 and the upper and lower edge portion of the longer end of the lever 17 being curved transversely to conform to the curvature of the inner walls of the lugs 22 and 23. The nozzle of the improved lubricating device comprises an inner annular section 24 which is made preferably of hardened tool steel and is adapted to withstand relatively great stresses without fracture or distortion. The section 24 of the nozzle is formed internally to produce a relatively short bore 25; it also is of relatively slight cross section area, a counterbore 26 at the upper end of the section 24 and a relatively long counterbore 27 which extends from the lower end of the section 24 for the greater part of the length of the section 24, and shoulder 28. This is produced between the bore 25 and the counterbore 26 and a shoulder 29 also is produced between the bore 25 and the counterbore 27. The counterbore 26 is provided with screw threads for engaging with the screw threads on the reduced lower end portion 2 of the tubular body or barrel 1 of the device and the section 24 is adapted to be screwed on to the reduced lower end portion 2 of the tubular body or barrel 1 until the lower end of the reduced portion 2 of the barrel abuts the shoulder 28. The portion of the section 24 in which the counterbore 27 is formed has a pair of diametrically opposite radial slots 30 which extend from the lower end of the section 24 vertically for part of the height of the counterbore and then are turned circumferentially and slightly upward in the walls of the section 24 as indicated at 31, the portions 31 of the slots in the walls of the section 24 being turned in the same direction circumferentially of the section 24 at the upper ends of the portions 30 of said slot and each of the portions 31 of the slots extending for only a relatively small part of the complete circumference of the section 24. The counterbore 27 is adapted for the reception of the extending upper end portion 32 of a nipple having an enlarged lower end portion 33 secured in the inlet opening 34 of a lubricant receptacle. The nipple 32—33 has an axial inlet opening 36 at its upper end in register with the bore 25 of the section 24 of the nozzle and the portion 32 of the nipple has a pair of outwardly extending opposite projections 37 adapted to enter and engage with the slots 30 and 31. In applying the nozzle portion 24 to the nipple, the nozzle is lowered onto the extending upper end portion of the nipple until the portion 32 of the nipple enters the counterbore 27 and abuts the shoulder 29, the projections 37 then being at the upper end of the portion 30 of the slots in the section 24 of the nozzle. It is to be understood that the construction of the nozzle may be of any suitable type such as a construction disclosing a sleeve covering or the nozzle may be made of one piece wherein the slots for interlocking the nozzle and the nipple do not extend entirely through the outer periphery thereof, as in Figs. 4 and 5. The tubular body or barrel 1 is then turned together with the section 24 of the nozzle to cause the engagement of the projections 37 on the nipple with the portions 31 of the slots in the section 24 of the nozzle so that any vertical movement of the device relative to the nipple is prevented. The body 1 of the device may be conveniently turned to engage the section 24 of the nozzle with the projections 37 of the nipple or to disengage the section 24 of the nozzle with the projections 37 of the nipple by means of a handle 38 having forks 39 embracing the enlarged upper end portion 4 of the tubular body 1 and connected with the enlarged upper end portion 4 of the body 1 by means of axially aligned pivot elements which may be set screws or pins 40 as shown. The handle 38 is capable of limited vertical swinging movement without imparting motion to the body 1 but the swinging of the handle 38 horizontally will cause turning of the body 1 and of the nozzle section 24, which is suitably connected with the body 1, about the longitudinal axis of the body 1. The nozzle of the device as stated above may be constructed in any suitabe manner having a sleeve portion 41 internally threaded or otherwise and which may serve as an additional means of strengthening the structure of the nozzle as well as to cover interlocking means.

In this invention the nozzle will have to be of exceptional strength owing to the fact that a stiff, hard lubricant is adapted to be used under high pressure. For this reason it is also apparent that the nozzle formed of a single piece having a slot which does not extend through the outer periphery of the nozzle may be particularly adaptable and advantageous from the point of view of strength and utility. The nipple is provided with a downwardly opening check valve 42 for controlling the passage of lubricant through the opening 36 at the upper end of the nipple.

It will be understood that the nozzle normally remains in association with the body 1 of the device so that the complete device is manipulated as a unit when it is desired to connect the device with the nipple of a lubricant receptacle.

The outer diameter of the nozzle is greater than that of the portion of the tubular body or barrel 1 on which the collar 6 is disposed so that the upper end of the nozzle will provide a stop for cooperating with the flange 3 to prevent any appreciable axial movement of the collar 6 on the body 1.

From the foregoing description of the various parts of the device, the operation thereof may be readily understood. The device is manipulated to connect the nozzle with the extending upper end portion of the nipple of the lubricant cup in the manner hereinbefore described and the operating handle 17 then is raised until the lower end of the plunger is above the lateral inlet opening 5 in the body 1. The bore of the body 1 below the inlet opening 5 then is filled with a stiff, hard lubricant and the operating handle 17 is then swung downward as required to force the plunger downward in the bore of the body 1, whereby the lubricant will be forced from the bore of the body 1 through the bore 25 of the nozzle into the nipple of the lubricant receptacle. The body of the device and the nozzle then are swung as a unit about the axis of the body 1 by manipulating the handle 38 until the lateral projections 37 on the extending upper end portion of the nipple are at the upper ends of the portions 30 of the slots in the section 24 of the nozzle and an upward movement of the lubricant gun then will move the nozzle of the lubricant gun completely out of engagement with the upper end portion of the nipple. The operation of filling a lubricant receptacle having an extending nipple inlet member by means of the device therefore requires but little labor and time.

The hard lubricant used in this invention is preferably a grease having a consistency that will withstand a very high temperature. Due to the character of this grease, it is advantageous to cut, or mold the lubricant or grease into sticks or slug portions, which may be readily and economically supplied into the lubricating device through the receiving opening described above and provided for the purpose.

Obviously, the invention is susceptible of embodiment in forms other than that which is illustrated in the accompanying drawings, all such modifications and adaptations thereof as fairly fall within the scope of the appended claims.

What we claim is:

1. Lubricating apparatus comprising a filler neck having a machined end provided with an aperture, a hard-lubricant expressing device detachably mounted on said neck and having a shoulder machined to fit said end, and including means for forcing hard lubricant through said aperture, said neck and device having cooperating cam elements to draw said shoulder tightly onto said end by rotation of said neck and device relatively to each other a support in said neck, a valve for closing said aperture and resting normally on said support closely adjacent to said aperture with the aperture open, and movable from said support to aperture closing position by expansion of hard lubricant filling said neck after removal of said device from the filled neck.

2. Lubricating apparatus comprising a filler neck having a machined end provided with an aperture, a hard-lubricant expressing device detachably mounted on said neck and having a shoulder machined to fit said end and including means for forcing hard lubricant through said aperture, said neck and device having cooperating cam elements to draw said device with its shoulder tightly on to said end by rotation of said neck and device relatively to each other, means on said device for rotating its cam elements relative to the cooperating elements of the filler neck a support in said neck, a valve for closing said aperture and resting normally on said support closely adjacent to said aperture with the aperture open, and movable from said support to aperture closing position by expansion of hard lubricant filling said neck after removal of said device from the filled neck.

3. Lubricating apparatus comprising a filler neck adapted to be fixed to a bearing and having a machined end provided with an aperture, a hard-lubricant expressing device detachably mounted on said neck and having a shoulder machined to fit said end and including means for forcing hard lubricant through said aperture, said neck and device having cooperating cam elements to draw said device with its shoulder tightly onto said end by rotation of said device relative to said neck, a lever pivoted to said device to rotate its cam elements relative to the cooperating cam elements on said filler neck a support in said neck, a valve for closing said aperture and resting normally on said support closely adjacent to said aperture with the aperture open, and movable from said support to aperture closing position by expansion of hard lubricant filling said neck after removal of said device from the filled neck.

4. Lubricating apparatus including a barrel having a nozzle at one end thereof provided with means for detachably connecting it to a filler neck, a handle pivoted to said barrel about an axis transverse to the axis of the barrel, said barrel having an opening through the wall thereof, a plunger reciprocable in said barrel past said opening, and means rotatable about the axis of said barrel to reciprocate said plunger.

5. Lubricating apparatus including a barrel having a nozzle at one end thereof provided with means for detachably connecting it to a filler neck, a handle pivoted to said barrel about an axis transverse to the axis of said barrel, said barrel having an opening through the wall thereof, a plunger reciprocable in said barrel past said opening, and means to reciprocate said plunger.

In testimony whereof we affix our signatures.

CARL SUTTER.
GEORGE A. PETTIT.